Figures 1, 2:
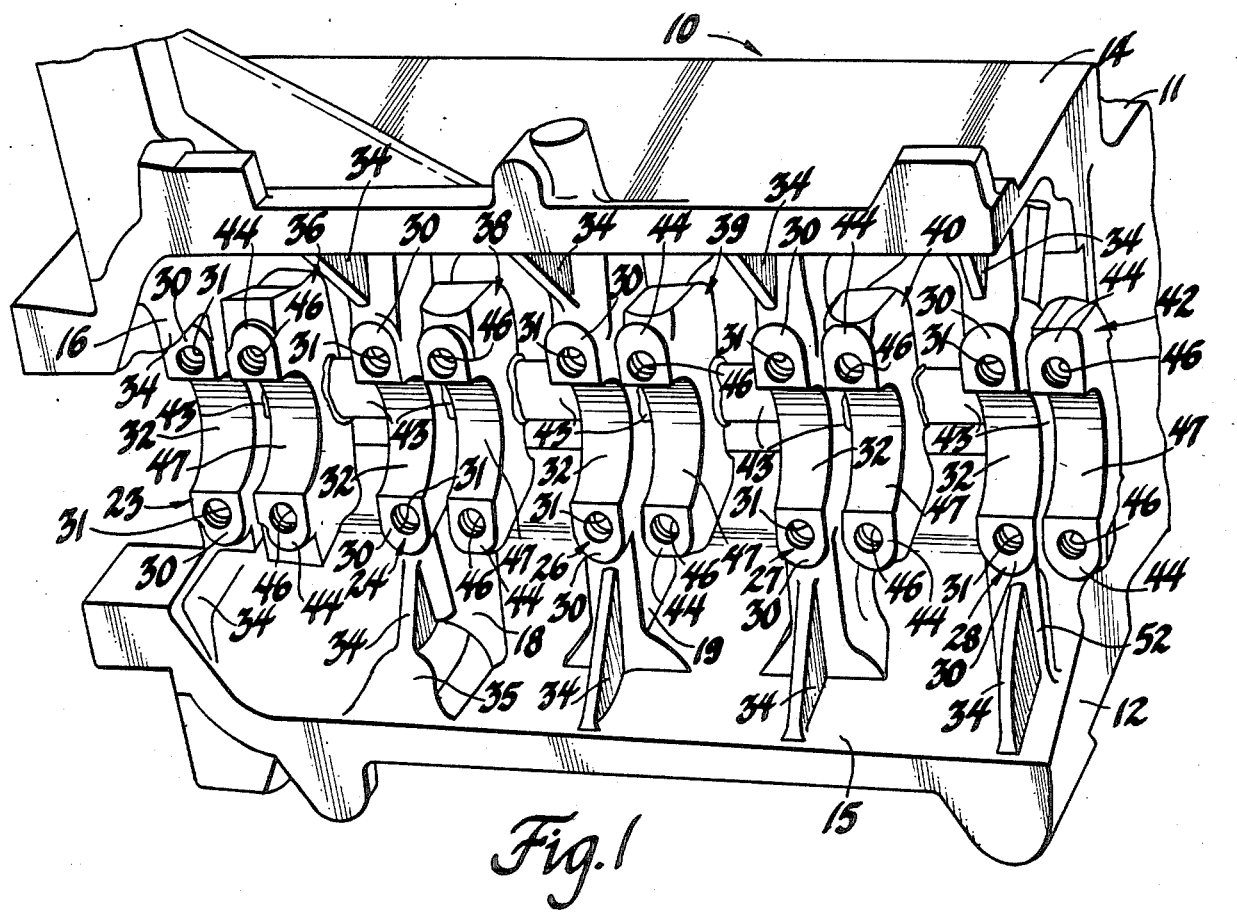

United States Patent [19]
Arnold

[11] Patent Number: 4,690,112
[45] Date of Patent: Sep. 1, 1987

[54] CRANKCASE STRUCTURE

[75] Inventor: Philip D. Arnold, Pleasant Ridge, Mich.

[73] Assignee: General Motors Corporation, Detroit, Mich.

[21] Appl. No.: 831,423

[22] Filed: Feb. 20, 1986

[51] Int. Cl.$^4$ .............................................. B21D 53/10
[52] U.S. Cl. ........................ 123/195 R; 29/156.4 R; 29/411; 29/416
[58] Field of Search ............ 123/195 R, 195 S, 195 C; 29/412–416, 156.4 R, 6

[56] References Cited

U.S. PATENT DOCUMENTS

| | | | |
|---|---|---|---|
| 3,818,577 | 6/1974 | Bailey et al. | 29/416 |
| 4,292,718 | 10/1981 | Iijima | 29/414 |
| 4,569,109 | 2/1986 | Fetouh | 29/413 |

Primary Examiner—Craig R. Feinberg
Attorney, Agent, or Firm—Robert J. Outland

[57] ABSTRACT

An improved crankcase structure and manufacturing method for engine blocks and the like wherein the crankcase is initially cast or otherwise formed with bearing caps integral therewith. The caps are preferably secured by severable connecting portions unidirectionally longitudinally adjacent their associated bearing receiving portions in the transverse webs of the cylinder block. The complete crankcase is then machined and the bearing caps are separated for subsequent assembly to the crankcase in conventional fashion. The invention reduces the amount of tooling and machining time and equipment required for manufacturing crankcases for engine blocks and the like.

7 Claims, 4 Drawing Figures

CRANKCASE STRUCTURE

FIELD

This invention relates to crankcase structures, especially of the type wherein crankshaft receiving elements are integrally formed with supporting means at least partially defining a crank chamber. In preferred embodiments, the invention pertains particularly to cast crankcase structures for internal combustion engines and the like and especially to engine cylinder blocks incorporating integrally cast crankshaft receiving webs with removable bearing caps.

BACKGROUND

It is known in the art of manufacturing engine cylinder blocks, crankcases and the like to form bearing caps for supporting the engine crankshaft separately from the crankcase supporting structure to which the caps are attached.

For example, it is common to cast an engine cylinder block, of cast iron, aluminum or other suitable material, as an integral structure that includes crankcase defining sidewalls interconnected by transverse webs incorporating main journal receiving means for the crankshaft. Individual bearing caps, applied to support the crankshaft in the journal receiving means, are commonly formed as separate castings or fabrications. These are machined or otherwise finished separately from the integral cylinder block and crankcase structure, commonly referred to as the engine block. After machining of these separate members, the bearing caps are usually attached to the journal receiving portions of the engine block and the bearing recesses of the block and caps are line bored to provide properly aligned cylindrical bearing openings for receiving the crank journals or main bearing inserts for supporting the journals.

This prior method of manufacture requiring plural independently machined components, while generally satisfactory, involves the expense of separate tooling fixtures and machinery for processing the cylinder blocks and bearing caps as well as separate molds or other manufacturing equipment for providing the castings, or otherwise formed separate structures, utilized to manufacture the block assembly with attached bearing caps.

INVENTION SUMMARY

The present invention provides a novel casting, or otherwise formed integral structure, and a method of manufacture for engine blocks, integral crankcases and the like which substantially reduces the casting and or manufacturing equipment required to provide an unmachined crankcase and the machining steps required for finishing the crankcase or engine block assembly.

According to the invention, the engine block, or other cylinder block or crankcase structure, may be formed as an integral casting, or an otherwise manufactured integral structure, having the usual side walls, webs and recessed journal receiving portions. In addition, the integral structure further includes bearing caps, preferably formed longitudinally adjacent to and equidistantly unidirectionally spaced from their associated bearing receiving portions to which they are connected by severable connecting means.

The unitary structure is subsequently machined so as to finish all the exposed surfaces requiring machining, including the joint faces of the bearing caps and bearing receiving portions, the bearing recesses and the attaching holes for securing the bearing caps to the journal receiving portions. Subsequent to, or as part of, the machining operations, the severable connecting portions are cut, by sawing or otherwise, so as to separate the bearing caps from their associated journal receiving portions and allow assembly of the separate cap members to the engine block or crankcase journal portions with bolts or other suitable fastening means for final line boring, if required.

All hole forming operations, including drilling reaming and threading of the support holes in the cylinder block journal receiving portions, may be accomplished before separation. Optionally, a gang drill may be utilized to initially drill all the attaching holes in the journal supporting portions of the block and then be indexed by the amount of the offset for drilling the attaching holes in the bearing caps, the same drills being used to form the mating bolt receiving holes of the associated cap and journal receiving portions.

These and other features and advantages of the invention will be more fully understood from the following description of selected embodiments taken together with the accompanying drawings.

DRAWINGS

Figure 3:
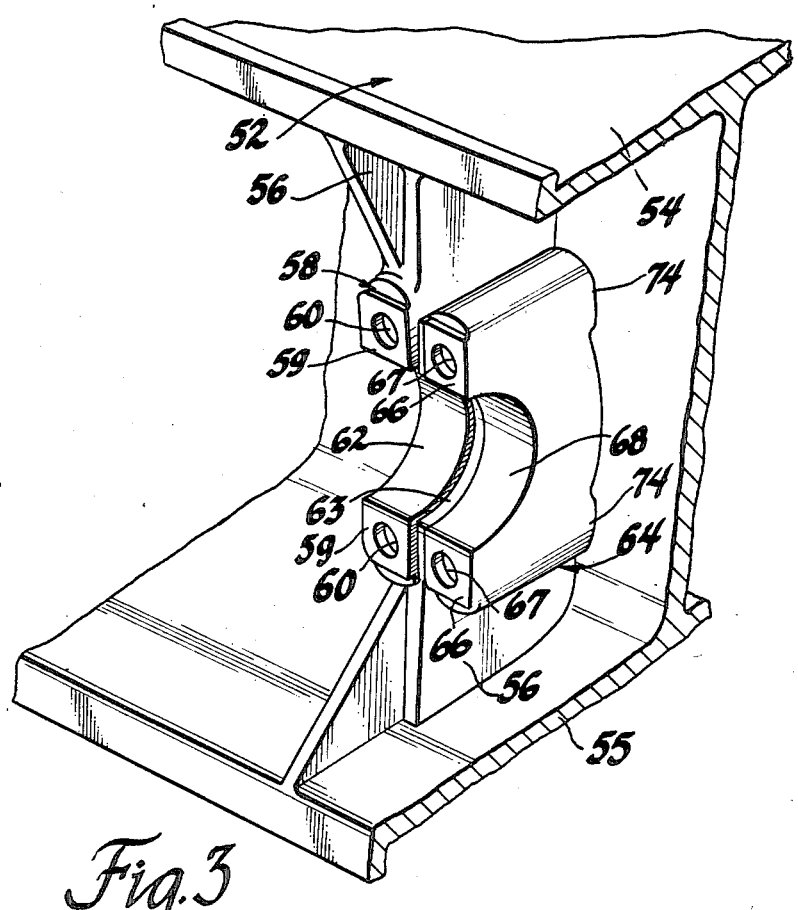
Figure 4:
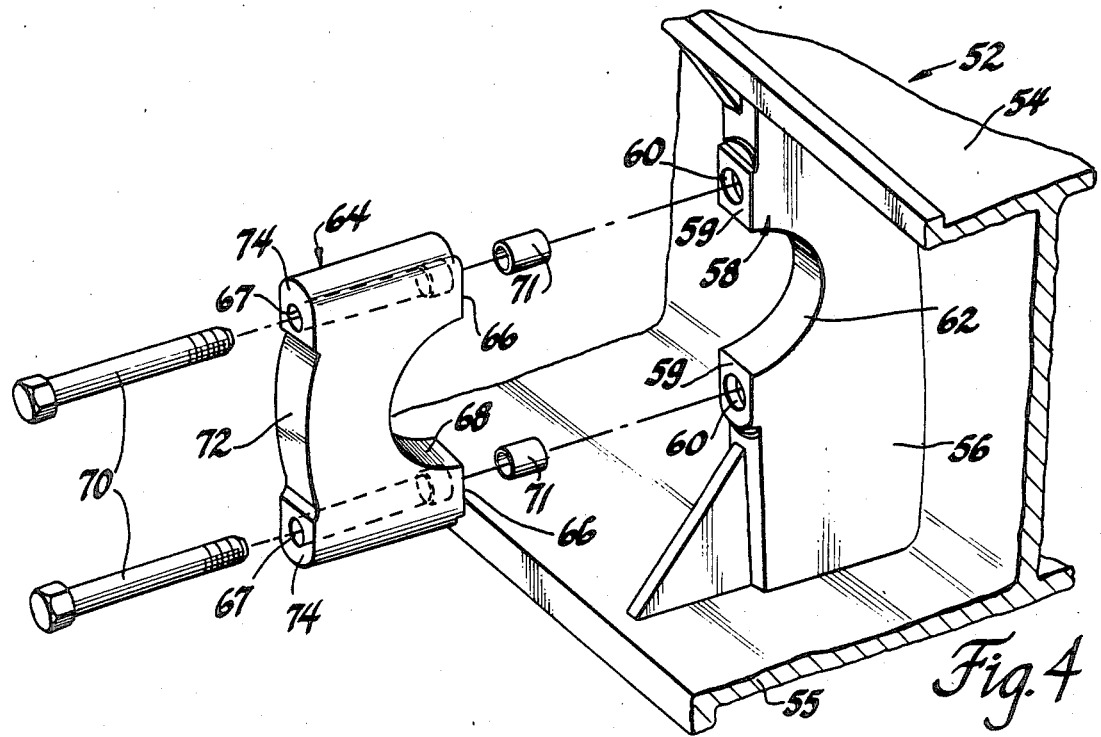

In the drawings:

FIG. 1 is a pictorial view of a partially machined engine cylinder block casting having integrally formed bearing caps in accordance with the invention, FIG. 2 is a pictorial view of a gang drill for drilling the bearing cap attaching openings in the block and bearing caps of FIG. 1, FIG. 3 is a fragmentary pictorial view showing an alternative embodiment of integral journal receiving and bearing cap structure, and FIG. 4 is an exploded pictorial view showing the assembly of a separated bearing cap to its associated journal receiving portion in a crankcase or engine block assembly in accordance with the invention.

DESCRIPTION

In the drawings, numeral 10 generally indicates an engine block having a single bank 11 of cylinders,, not shown, the upper portion of the cylinder bank being omitted from the drawings. The lower portion of the block comprises a unitary crankcase 12, preferably cast integrally with the upper cylinder bank portion of the engine block. The crankcase portion 12 is adapted to define the upper portion of a complete engine crankcase, the lower portion being enclosed by an oil pan, not shown, subsequently attached to the engine block.

In the unitary, or integral, crankcase 12, there are included a pair of laterally spaced longitudinally extending side walls 14, 15. These are laterally interconnected at spaced intervals intermediate their ends by five transverse bulkheads, walls or webs 16, 18, 19, 20, 22, in which there are respectively provided enlarged laterally extending crankshaft journal receiving portions 23, 24, 26, 27, 28. Each of these portions, as machined, includes a pair of joint faces 30, a pair of bearing cap attaching openings 31, which are threaded and reamed at their outer edges for hollow dowels, not shown, and a semicylindrical bearing recess 32, the recesses being coaxial with a longitudinal axis, not shown. The transverse webs may include depending stiffening gussets 34 and an enlarged boss 35, or the like, for the subsequent provision of an oil drain or dip stick opening as desired.

In accordance with the invention, there are cast integral with the engine block and adjacent to each of the journal receiving portions, bearing caps 36, 38, 39, 40, 42. Each of the bearing caps is spaced adjacent and equidistantly longitudinally offset from an associated journal receiving portion and is attached thereto and to the other journal receiving portions and bearing caps by severable connecting portions 43. In the illustrated construction, portions 43 are conveniently formed by a runner passage in the mold, not shown, the runner passage having the additional function of transferring molten cast metal to the various bearing cap and journal receiving portions during pouring of the casting. However, these connecting portions 43 are utilized in particular, according to the invention, to support the bearing caps 36, 38, 39, 40, 42 in position adjacent their associated journal receiving portions 23, 24, 26, 27, 28, respectively, for purposes to be subsequently discussed.

Each of the bearing caps, as machined, includes a pair of joint faces 44, a pair of attaching openings 46 drilled through the joint faces to the opposite ends of the bearing caps and reamed adjacent the joint faces to receive a hollow dowel, and a bearing recess 47. The recesses 47 are substantially semi-cylindrical and are aligned coaxially on the same longitudinal axis as the recesses 32 of the journal receiving portions.

As shown, FIG. 1 represents an integral engine block casting which is fully machined, except for the final step of separating the bearing caps from the remainder of the integral structure for a purpose and in a manner to be subsequently described.

Referring now to FIG. 2, there is shown the head portion 48 of a gang drill having ten rotary spindles 50, each containing a drill 51 and all spaced at the center distances of the attaching holes, or openings 31, of the various journal receiving portions.

Referring now to FIG. 3, numeral 52 generally indicates a slightly different embodiment of integral crankcase, only a portion of which is shown. The crankcase 52 includes parallel side walls 54, 55 interconnected by a plurality of laterally extending webs 56, only one of which is shown. Each web 56 includes an enlarged integral crank journal receiving portion 58 having, as machined, joint faces 59, attaching openings 60 and a bearing recess 62, similar in character to those of the embodiment of FIG. 1.

Adjacent each of the journal receiving portions 58, there is attached by a severable connecting portion 63 a bearing cap 64, which also includes joint faces 66, attaching openings 67 and a bearing recess 68 similar in character to those of the embodiment of FIG. 1.

In FIG. 4, there is shown the crankcase assembly resulting from processing the structure of FIG. 3 to remove the bearing cap 64 from its connection with the journal receiving portion 58 and the assembly of the bearing cap 64 to the journal receiving portion 58 utilizing connecting bolts 70 and hollow dowels 71 to secure and align the assembled elements in their desired positions. FIG. 4 also illustrates the lower end 72 of the bearing cap 64, including seats 74 engagable by the bolt heads and which, it should be obvious, may be finished, if desired, in separate machining operations on the bearing cap.

MANUFACTURING METHOD

A preferred method of manufacturing a crankcase assembly, as shown in FIG. 4, or an engine block assembly or the like involves the following steps:

1. An integral crankcase or block, as shown in FIGS. 3 and 1 after machining, is formed, preferably by casting although other types of fabrication, such as welding, brazing, etc. could be used if desired. The as cast, or unmachined, crankcase preferably includes substantially coaxial unfinished or unmachined bearing recesses in the bearing caps and the associated journal receiving portions.

2. The engine block or crankcase is then machined, preferably including finish machining of all exposed surfaces, such as the upper deck, the lower edges of the side walls and the joint faces and recesses of the bearing caps and journal receiving portions. The attaching openings in the caps and journal receiving portions are also machined at this time.

The gang drill of FIG. 2 is especially arranged for drilling the attaching openings of the embodiment of FIG. 1. This may be accomplished in sequential drilling steps including first, drilling all the openings in the joint receiving portions. Subsequently, the head portion 48 is indexed a distance equal to the longitudinal offset of the centers of the bearing caps from the centers of their associated journal receiving portions and the mating holes of the associated bearing caps are then drilled in a single pass of the drill head by the same drills which formed the mating openings in the associated journal receiving portions. Similar tooling may be utilized to ream the outer edges of the attaching openings of the journal receiving portions and bearing caps in consecutive passes and to tap threads in the openings of the journal receiving portions if desired.

3. After the block or crankcase is completely machined, and possibly as part of the same machining process, the bearing caps are separated from the remainder of the crankcase and their associated journal receiving portions by cutting away, such as by sawing, the connecting portions securing the bearing caps to the remainder of the crankcase. Thereafter, any necessary final finishing, such as machining or spot facing the bearing cap seats 74, may be performed and the caps are assembled to their associated journal receiving portions utilizing appropriate hollow dowels and attaching bolts, such as dowels 71 and bolts 70, respectively.

4. Finally, the bearing recesses of all the attached bearing caps and journal receiving portions are line bored to provide perfectly aligned cylindrical bearing openings which may be intended to receive bearing inserts or to act directly as bearings in appropriate circumstances. If desired, it may be possible to omit the line boring step although it is, at present, considered desirable if not absolutely necessary in order to obtain sufficient accuracy for proper crankshaft bearing support.

While it is presently considered most desirable that the mounting of the bearing caps, as cast with the integral crankcase, should be such as to be offset longitudinally an amount equidistant from their respective associated journal receiving portions, it should be apparent that other arrangements for casting the bearing caps together with the crankcase might also be utilized and advantageous. Thus, two bearing caps might be located between two adjacent journal receiving members or a full set of bearing caps might be located between two adjacent webs or at one end of the cylinder block. These variations, while not presently considered to be the best manner of carrying out the invention, are nevertheless considered to be within the scope of the structures and methods contemplated in the present invention.

While the invention has been described by reference to certain embodiments chosen for purposes of illustration, it should be understood that numerous changes could be made without departing from the spirit and scope of the inventive concepts disclosed. Accordingly, it is intended that the invention not be limited to the disclosed methods and embodiments, but that it be given the full scope permitted by the language of the following claims.

The embodiments of the invention in which an exclusive property or privilege is claimed are defined as follows:

1. An integral crankcase comprising
   a pair of laterally spaced longitudinally extending side walls partially defining a crank chamber,
   a plurality of transverse webs extending between the side walls at longitudinally spaced locations therealong, each of said webs having a journal receiving portion with a bearing recess located between the walls, said recesses being substantially longitudinally coaxial, and
   separable bearing caps formed adjacent longitudinally to said journal receiving portions, said caps each having a bearing recess coaxial with the recesses of said journal receiving portions and with one another.

2. A crankcase as in claim 1 wherein said caps comprise bodies which are spaced from one another and from said journal receiving portions but are connected together with at least one adjacent journal receiving portion by severable connecting portions.

3. A crankcase as in claim 1 wherein said caps comprise bodies which are each displaced to one side of an associated journal receiving portion and are connected to their respective associated portions by severable connecting portions.

4. A crankcase as in claim 3 wherein said caps are all displaced equidistantly in the same directions from their respective associated journal receiving portions.

5. An integral engine block casting comprising
   a pair of laterally spaced longitudinally extending side walls partially defining a crank chamber,
   a plurality of transverse webs extending between the side walls at longitudinally spaced locations therealong, each of said webs having a journal receiving portion with a bearing recess located between the walls, said recesses being substantially coaxial, and
   separable bearing caps formed adjacent longitudinally to at least one of said journal receiving portions, said caps each having a bearing recess coaxial with the recesses of said journal receiving portions and with one another.

6. A casting as in claim 5 wherein said caps comprise bodies which are each displaced to one side of an associated journal receiving portion and are connected to their respective associated portions by severable connecting portions.

7. A casting as in claim 6 wherein said caps are all displaced equidistantly in the same directions from their respective associated journal receiving portions.

* * * * *